F. N. ROEHRICH.
AMMONIA PIPE UNION.
APPLICATION FILED AUG. 26, 1912.
1,132,619.
Patented Mar. 23, 1915.
2 SHEETS—SHEET 2.
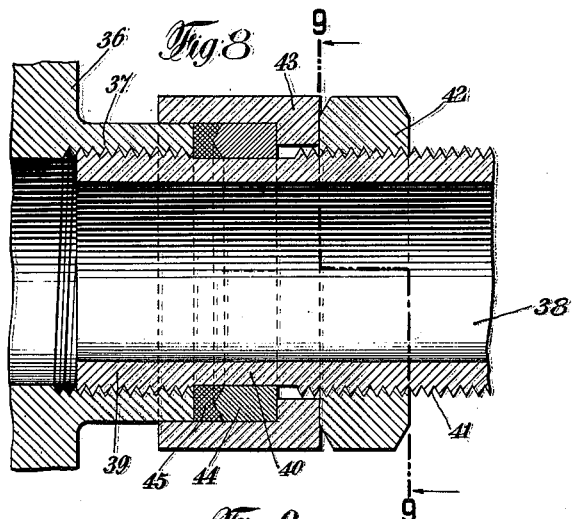
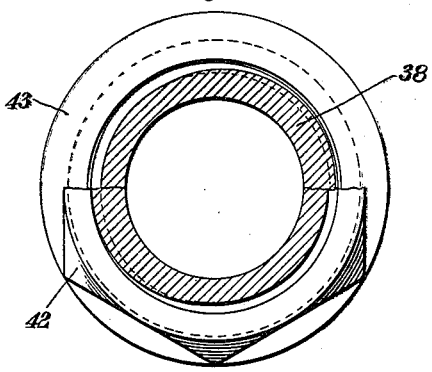
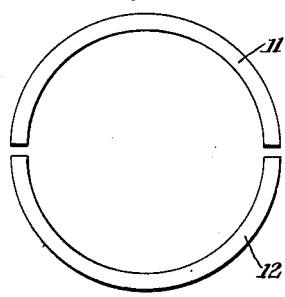 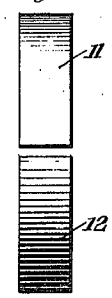 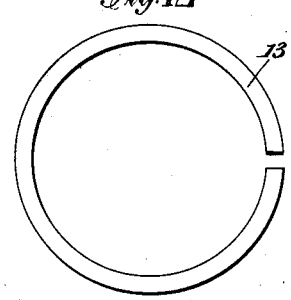 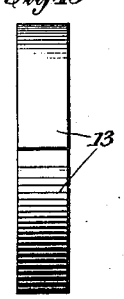
Witnesses:
John E. Prager.
A. Worden Gibbs.
Frank N. Roehrich, Inventor
By his Attorney
George P. Carroll

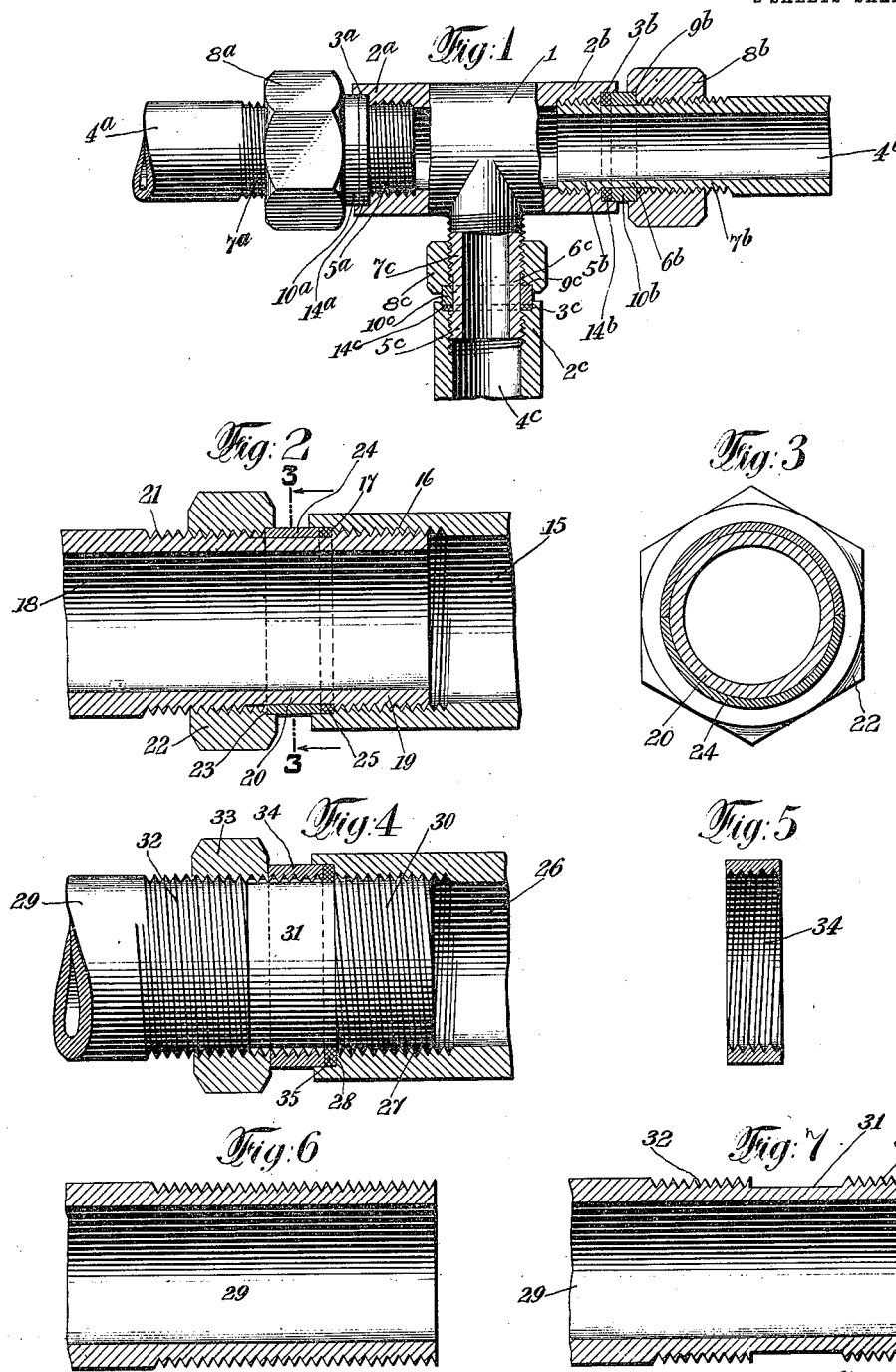

UNITED STATES PATENT OFFICE.

FRANK N. ROEHRICH, OF JERSEY CITY, NEW JERSEY, ASSIGNOR TO GEORGE P. CARROLL, OF BRIDGEPORT, CONNECTICUT.

AMMONIA-PIPE UNION.

1,132,619. Specification of Letters Patent. Patented Mar. 23, 1915.

Application filed August 26, 1912. Serial No. 717,142.

*To all whom it may concern:*

Be it known that I, FRANK N. ROEHRICH, a citizen of the United States, residing at Jersey City, in the county of Hudson and State of New Jersey, have invented a new and useful Ammonia-Pipe Union, of which the following is a specification.

My invention relates to improvements in unions employed to connect the adjacent ends of pipes or conduits, especially when of small or moderate capacity, and especially when used for the transmission of high tension fluids, such as ammonia or carbon dioxid, whether in liquefied or vaporous condition.

My general purpose is to construct a union that will be simple, strong, compact, economical of construction and easy to connect and disconnect.

In order to make a tight joint, between an externally threaded pipe and an internally threaded major conduit, it is common to put a taper thread on the pipe and then to make up the joint with some substance like litharge and glycerin or else to solder the joint. One disadvantage of a litharge joint is that it is liable to leak after a while. A soldered joint, on the other hand, has to be broken to be disconnected. And with either make up of joint, it is impossible to predetermine accurately the distance that the taper threaded pipe will have to be screwed into the major conduit. Consequently the length of the pipe, exterior to the conduit, is variable.

My purpose further is to use a straight thread on the pipe so that its exterior length can be accurately predetermined and yet to make a permanently tight and easily disconnectible joint.

My invention further relates to the process of connecting the adjacent ends of pipes or other conduits, and has for its further purpose the connecting of such ends so that they will be absolutely tight and yet easily disconnectible.

The means employed for accomplishing these purposes are disclosed in the accompanying drawings and in the description relating thereto.

In the drawings Figure 1 is a partial front elevation and a partial vertical section of two forms of my invention, applied in connecting a T with three pipes. Fig. 2 is a vertical section of a third form of my invention, applied in connecting two pipes. Fig. 3 is a vertical section through the line 3—3 of the preceding figure, looking toward the left. Fig. 4 is a partial front elevation and a partial vertical section of a fourth form of my invention, applied in connecting two pipes. Fig. 5 is a vertical section of the compressing means used in said fourth form. Fig. 6 is a vertical section of the externally threaded pipe shown in the preceding figure, but before it has been finally machined. Fig. 7 is a vertical section of the same pipe after it has been finally machined. Fig. 8 is a vertical section of a fifth form of my invention, applied in connecting a chamber casing and a pipe. Fig. 9 is a vertical section through the line 9—9 of the preceding figure, looking toward the left. Fig. 10 is a right end elevation of one form of compressing means. Fig. 11 is a front elevation of the structure of the preceding figure. Fig. 12 is a right end elevation of an alternative form of compressing means. Fig. 13 is a front elevation of the structure of the preceding figure.

First considering Figs. 1, 10, 11, 12 and 13: A pipe T1 has an internally threaded left end section $2^a$, an internally threaded right end section $2^b$ and a lower end section. The section $2^a$ is counterbored at its outer end, for substantially twice the depth of its threads, so as to form a recess $3^a$; and the section $2^b$ is counterbored at its outer end, for substantially twice the depth of its threads, so as to form a recess $3^b$. The lower end section of the T 1 has an externally threaded section $5^c$ at its extreme lower end; its has just above its section $5^c$ an unthreaded section $6^c$ of about equal length and of about the same external diameter as is the section $5^c$ at the root of its threads; and it has just above its section $6^c$ another threaded section $7^c$ in all respects like the section $5^c$.

A pipe $4^b$ has an externally threaded section $5^b$ at its extreme left end; it has next to its section $5^b$ an unthreaded section $6^b$ of about equal length and of about the same external diameter as is the section $5^b$ at the root of its threads; and it has next to its section $6^b$ another threaded section $7^b$ in all respects like the section $5^b$. A nut $8^b$ screws over the section $5^b$, passes over the section $6^b$ without engagement and screws over the section $7^b$. Preferably, as shown, the nut $8^b$ is counterbored so as to form, at its outer end, a slight recess $9^b$ of the same diameter as the recess $3^b$.

A pipe $4^a$ has an externally threaded section $5^a$ at its extreme right end; it has next to its section $5^a$ an unthreaded section in all respects similar to the section $6^b$, but unshown herein; and it has farther to the left another threaded section $7^a$ in all respects like the section $5^a$. An unrecessed nut $8^a$ screws over the section $5^a$, passes over the adjoining unshown section without engagement and screws over the section $7^a$. The nut $8^a$ may be counterbored to form a recess, like the recess $9^b$, but a plain nut, as shown, is practically as good. After the nut $8^b$ has been screwed over the pipe $4^b$ about as far as the right end of its section $7^b$, compressing means $10^b$ are placed in the recess $9^b$. The compressing means $10^b$ may be as shown enlarged in Figs. 10 and 11 and there consist of a thin half ring 11 and a thin half ring 12 that when placed together form one ring. It is obvious that the half rings 11 and 12 may be placed around the section $6^b$ without passing over the section $5^b$ at all. If preferred, instead of the half rings 11 and 12, the compressing means may consist, as shown enlarged in Figs. 12 and 13, of one ring 13 with a longitudinal split. If the ring 13 is used as the compressing means, it is sprung outward slightly and is then passed over the sections $5^b$ and $6^b$ until it rests in the recess $9^b$. After the nut $8^a$ has been screwed over the pipe $4^a$ about as far as the left end of its section $7^a$, compressing means $10^a$, either like the half rings 11 and 12 or like the ring 13, are placed against the nut. A gasket $14^b$, preferably of lead, as are preferably all of the gaskets described herein, is placed so as to bear against the compressing means $10^b$. A similar gasket $14^a$ is also placed so as to bear against the compressing means $10^a$.

The pipe $4^b$ is screwed into the T 1 until the section $5^b$ occupies the section $2^b$ and until the section $6^b$ extends inward as far as the depth of the recess $3^b$. The nut $8^b$ is then screwed in a reverse direction until the gasket $14^b$ occupies the bottom of the recess $3^b$ and the adjacent end of the compressing means $10^b$ also occupies the same recess; and the nut is further reversely screwed until the compressing means so flatten the gasket that the latter makes a tight joint between the sections $2^b$ and $5^b$.

It will be noted that, in being flattened, the gasket $14^b$ is forced sidewise against a smooth surface on its outer edge and, as is more important, against a smooth surface on its inner edge; and that the gasket perfectly covers whatever space there may be between the threads of the sections $2^b$ and $5^b$. The joint thus made is therefore absolutely tight. When, moreover, it is desired to break the joint, this is easily done by first unscrewing the nut $8^b$ and then the pipe $4^b$, the compressing means $10^b$ and the gasket $14^b$ being easily removable. In this first form of my invention the walls of the recess $3^b$ and of the recess $9^b$ coöperate in holding in place the compressing means $10^b$, which is especially desirable if the half rings 11 and 12 are used. Similarly the pipe $4^a$ is screwed into the T 1 until the section $5^a$ occupies the section $2^a$ and until its unshown unthreaded section extends inward as far as the depth of the recess $3^a$. The nut $8^a$ is then screwed in a reverse direction until the gasket $14^a$ occupies the bottom of the recess $3^a$ and the adjacent end of the compressing means $10^a$ also occupies the same recess; and the nut is further reversely screwed until the compressing means so flatten the gasket that the latter makes a tight joint between the sections $2^a$ and $5^a$. In this second form of my invention, as before, an absolutely tight joint is made, that may be easily disconnected. But here only the walls of the recess $3^a$ hold in place the compressing means $10^a$, there being in the nut $8^a$ no recess wall to act in coöperation. Hence in this second form of my invention it is better to use the ring 13 as the compressing means.

The first form of my invention is also applied, in a reverse manner, to the lower end of the T 1. A pipe end $4^c$ has an internally threaded upper section $2^c$, which is counterbored at its upper end, for substantially twice the depth of its threads, so as to form a recess $3^c$. A nut $8^c$ screws over the section $5^c$, passes over the section $6^c$ without engagement and screws over the section $7^c$. The nut $8^c$ is counterbored so as to form, at its lower end, a slight recess $9^c$ of the same diameter as the recess $3^c$. Compressing means $10^c$, of either form above shown, are placed in the recess $9^c$ and a gasket $14^c$ is placed next under them. The pipe $4^c$ is screwed over the T 1 until the section $2^c$ covers the section $5^c$ and until the bottom of the recess $3^c$ reaches the lower end of the section $6^c$. The nut $8^c$ is then screwed in a reverse direction until the gasket $14^c$ occupies the bottom of the recess $3^c$ and the adjacent end of the compressing means $10^c$ also occupies the same recess; and the nut is further reversely screwed until the compressing means so flatten the gasket that the latter makes a tight joint between the sections $2^c$ and $5^c$. This form of union is precisely the same in construction and effect as is the union between the T 1 and the pipe $4^b$; but here the pipe $4^c$ is the member that is internally threaded and the lower end of the T is the member that is externally threaded.

Next considering Figs. 2 and 3: A larger pipe 15 has an internally threaded section 16 that is counterbored at its outer end, for substantially twice the depth of its threads, so as to form a recess 17. A smaller pipe 18 has an externally threaded section 19 at its end next to the pipe 15; it has next to its section 19 an unthreaded section 20 of about equal length and of about the same external diameter as is the section 19 at the root of its threads; and it has next to its section 20 another threaded section 21 in all respects like the section 19. A nut 22 screws over the section 19, passes over the section 20 without engagement and screws over the section 21. Preferably, as shown, the nut 22 is counterbored so as to form, at its outer end, a slight recess 23, of the same diameter as the recess 17. Compressing means 24 correspond to the compressing means 10$^b$; and a gasket 25 corresponds to the gasket 14$^b$. And the parts are assembled precisely as in the first form of my invention and with the same effect in making a tight joint, that, however is easily disconnected. The only difference here is that the recesses 17 and 23 extend only to about the root of the threads of the pipes 15 and 18. Consequently the pipe 15, at its joint with the gasket 25 and the compressing means 24, is thicker and stronger than is the T 1 at its corresponding joints. This form of construction is therefore especially adapted for use with thin pipes.

Next considering Figs. 4, 5, 6 and 7: A larger pipe 26 has an internally threaded section 27 that is counterbored at its outer end, for substantially twice the depth of its threads, so as to form a recess 28. A smaller pipe 29 has an externally threaded section 30 at its end next to the pipe 26; it has next to the section 30 an unthreaded section 31 of about equal length and of about the same external diameter as is the section 30 at the root of its threads; and it has next to the section 31 another threaded section 32 in all respects like the section 30. An unrecessed nut 33, like the nut 8$^a$, screws over the section 30, passes over the section 31 without engagement and screws over the section 32. Here the compressing means 34 consist of an internally threaded, integral ring, as shown in Fig. 5, that screws over the section 30 until it surrounds the section 31, without engaging therewith. A gasket 35 is placed so as to bear against the compressing means 34. The pipe 29 is screwed into the pipe 26 until the section 30 occupies the section 27 and until the section 31 extends inward as far as the depth of the recess 28. The nut 33 is then screwed in a reverse direction until the gasket 35 occupies the bottom of the recess 28 and the adjacent end of the compressing means 34 also occupies the recess; and the nut is further reversely screwed until the compressing means so flatten the gasket that the latter makes a tight joint as before. The advantage of this construction is that the compressing means 34 are not split, even to the extent shown in Figs. 12 and 13, but are strictly integral; and that therefore the nut 33 need not be recessed under even the most trying conditions of strain.

In Fig. 6 is shown the pipe 29 as it is orginally threaded. In Fig. 7 the pipe 29 is shown in its final form, after the intermediate unthreaded section 31 of reduced diameter, about equal to the depth of the threads, has been machined upon it, so as to leave on each side the threaded sections 30 and 32. For forming the section 31, the pipe 29 may be placed in a lathe or a special tool may be used. A pipe, in the condition shown in Fig. 7, is common to all the forms of my invention.

Finally considering Figs. 8 and 9: A chamber casing 36 has an internally threaded section 37, but it has no recess. A pipe 38 has an externally threaded section 39 at its extreme left end; it has next to the section 39 an unthreaded section 40 of about equal length and of about the same external diameter as is the section 39 at the root of its threads; and it has next to the section 40 another threaded section 41 of a diameter uniform with the section 39. A nut 42 screws over the section 41 and is unrecessed. Next to the nut 42 is placed a cup ring 43, with its perforated end wall next to the nut and around the section 41. The internal diameter of the main part of the cup ring 43 just permits it to be slid over the part of the casing 36 outside of the section 39. Within the cup ring 43 is placed bearing means 44, consisting of two half rings similar to the half rings 11 and 12. But on the end away from the nut 42, the bearing means 44 have an angular, annular tongue. A gasket 45 fits into the cup ring 43 and over the tongue of the bearing means 44. The parts 43 and 44 constitute the compressing means in this fifth form of my invention. The pipe 38 is screwed into the casing 36 until the section 39 occupies the section 37 and until the section 40 just reaches the end of the casing. The nut 42 is then screwed up until the compressing means 43 and 44 compress and force the gasket 45 directly against the end of the casing 36 and laterally against the section 40 so as to make a tight joint between the sections 37 and 39. As before, to disconnect the parts, the nut 42 is first unscrewed and then the pipe 38. This form of construction is especially adapted for connecting pipes with valve casings and tank casings.

It will be noted that all these forms of construction have, as features in common, an internally threaded major conduit, an externally straight threaded minor conduit screwed into said major conduit, a gasket occupying a space outside of said major conduit and at the end of said major conduit, compressing means compressing said gasket over the joint between said conduits, and a nut screwed around said minor conduit and forcing said compressing means to so compress said gasket. It is to be further noted that the threading of said minor conduit is in two sections with an intermediate unthreaded section of reduced diameter and that the gasket is compressed laterally against the intermediate section of the minor conduit. I have found that, while with most liquids, a tight joint can be made even if the gasket is compressed laterally against a threaded surface on the minor conduit, yet, to make a joint absolutely tight against ammonia, it is necessary that the surface, against which a gasket, especially if of lead, is compressed laterally, should be unthreaded.

The gaskets, above referred to, may be constructed and put in place in various ways. A gasket may consist of an ordinary lead ring and may be passed over the threaded end section of the minor conduit, being afterward flattened by the compressing means. It may consist of two flat lead rings, each slit on one side, as is the ring shown in Fig. 12, and placed in position as is that ring, the two rings, however, being placed one over the other so that their slits do not coincide. It may consist of a lead wire, or of a so-called lead rope, cut the proper length and bent into place. All these forms of lead gaskets are well known in the art.

The processes of making connections, between the various kinds of major and minor conduits, have already been sufficiently described in particular. In most general terms the process is to internally thread the major conduit, to externally thread the minor conduit so that the extreme end of its threaded part will screw into said major conduit, to screw a nut around the other end of the threaded part of said minor conduit, to place compressing means around said minor conduit next to said nut, to place a gasket in the space outside of said minor conduit and at the end of said major conduit, to screw said extreme threaded end into said major conduit, and to screw up said nut so that said compressing means will compress said gasket so as to tightly cover the adjacent joint between said conduits.

What I have invented and what I desire to have protected by Letters Patent is expressed in claims as follows:

1. In combination an internally threaded major conduit, a minor conduit externally threaded in two sections with an intermediate plain section for screwing at its threaded end section into said major conduit, a gasket for occupying a space outside of said intermediate section and at the end of said major conduit, compressing means for completely inclosing said gasket and for compressing it over the joint between said conduits, and a nut adapted to be screwed around said other threaded section so as to force said compressing means to so compress said gasket.

2. In combination an internally threaded major conduit having a surface adjacent to the end of its threads in a plane such that the axis of the conduit is substantially perpendicular to the plane, a minor conduit externally threaded in two sections with an intermediate plain section for screwing at its threaded end section into said major conduit, a gasket for occupying a space outside of said intermediate section and adjacent to said surface, compressing means for completely inclosing said gasket and for compressing it over the joint between said conduits, and a nut adapted to be screwed around said other threaded section so as to force said compressing means to so compress said gasket.

3. In combination an internally threaded major conduit, a minor conduit externally threaded in two sections with an intermediate plain section of reduced diameter for screwing at its threaded end section into said major conduit, a gasket for occupying a space outside of said intermediate section and at the end of said major conduit, compressing means for completely inclosing said gasket and for compressing it over the joint between said conduits, and a nut adapted to be screwed around said other threaded section so as to force said compressing means to so compress said gasket.

4. In combination an internally threaded major conduit having a surface adjacent to the end of its threads in a plane such that the axis of the conduit is substantially perpendicular to the plane, a minor conduit externally threaded in two sections with an intermediate plain section of reduced diameter for screwing at its threaded end section into said major conduit, a gasket for occupying a space outside of said intermediate section and adjacent to said surface, compressing means for completely inclosing said gasket and for compressing it over the joint between said conduits, and a nut adapted to be screwed around said other threaded section so as to force said compressing means to so compress said gasket.

5. In combination an internally threaded major conduit counterbored at an end to form an annular recess at the end of its threads, a minor conduit externally threaded in two sections with an intermediate plain section for screwing at its threaded end section into said major conduit, a gasket for occupying the space outside of said intermediate section at the inner end of said recess, compressing means for covering said gasket in said recess and for compressing the gasket over the joint between said conduits, and a nut adapted to be screwed around said other threaded section so as to force said compressing means to so compress said gasket.

6. In combination an internally threaded major conduit counterbored at an end to form an annular recess at the end of its threads, a minor conduit externally threaded in two sections with an intermediate plain section of reduced diameter for screwing at its threaded end section into said major conduit, a gasket for occupying the space outside of said intermediate section at the inner end of said recess, compressing means for covering said gasket in said recess and for compressing the gasket over the joint between said conduits, and a nut adapted to be screwed around said other threaded section so as to force said compressing means to so compress said gasket.

7. In combination an internally threaded major conduit counterbored at one end for substantially twice the depth of its threads to form an annular recess at the end of its threads, a minor conduit externally threaded in two sections with an intermediate plain section for screwing at its threaded end section into said major conduit, a gasket for occupying the space outside of said intermediate section at the inner end of said recess, compressing means for covering said gasket in said recess and for compressing the gasket over the joint between said conduits, and a nut adapted to be screwed around said other threaded section so as to force said compressing means to so compress said gasket.

8. In combination an internally threaded major conduit counterbored at an end for substantially twice the depth of its threads to form an annular recess at the end of its threads, a minor conduit externally threaded in two sections with an intermediate plain section of reduced diameter for screwing at its threaded end section into said major conduit, a gasket for occupying the space outside of said intermediate section at the inner end of said recess, compressing means for covering said gasket in said recess and for compressing the gasket over the joint between said conduits, and a nut adapted to be screwed around said other threaded section so as to force said compressing means to so compress said gasket.

FRANK N. ROEHRICH.

Witnesses:
    JOHN E. PRAGER,
    A. WORDEN GIBBS.